United States Patent
Chatterjee et al.

(10) Patent No.: US 10,528,669 B2
(45) Date of Patent: Jan. 7, 2020

(54) METHOD AND DEVICE FOR EXTRACTING CAUSAL FROM NATURAL LANGUAGE SENTENCES FOR INTELLIGENT SYSTEMS

(71) Applicant: Wipro Limited, Bangalore (IN)

(72) Inventors: Arindam Chatterjee, Chandannagar (IN); Kartik Subodh Ballal, Pune (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/937,629

(22) Filed: Mar. 27, 2018

(65) Prior Publication Data

US 2019/0294671 A1 Sep. 26, 2019

(30) Foreign Application Priority Data

Mar. 20, 2018 (IN) .............................. 201841010091

(51) Int. Cl.
*G06F 17/27* (2006.01)
*G10L 25/30* (2013.01)

(52) U.S. Cl.
CPC ........ *G06F 17/2785* (2013.01); *G06F 17/274* (2013.01); *G06F 17/2775* (2013.01); *G10L 25/30* (2013.01)

(58) Field of Classification Search
CPC ............... G06F 17/2785; G06F 17/274; G06F 17/2775; G10L 25/30
See application file for complete search history.

(56) References Cited

U.S. PATENT DOCUMENTS

| | | | |
|---|---|---|---|
| 2009/0150156 A1* | 6/2009 | Kennewick | G06Q 30/0261 704/257 |
| 2017/0286401 A1* | 10/2017 | He | G06F 17/16 |
| 2017/0330098 A1 | 11/2017 | Best et al. | |
| 2018/0121799 A1* | 5/2018 | Hashimoto | G06F 17/2715 |
| 2018/0341698 A1* | 11/2018 | Wang | G06F 17/2715 |

OTHER PUBLICATIONS

Sorgente et al., "Automatic Extraction of Cause-Effect Relations in Natural Language Text," DART@AI*IA 1109:37-48 (2013).

* cited by examiner

*Primary Examiner* — Sonia L Gay
(74) *Attorney, Agent, or Firm* — Pepper Hamilton LLP

(57) ABSTRACT

A method and device for extracting causal from natural language sentences is disclosed. The method includes determining, by a computing device, a plurality of parameters for each target word in a sentence inputted by a user. The method further includes processing for each target word, by the computing device, an input vector comprising the plurality of parameters for a causal classifier neural network. The method includes identifying, by the computing device, causal tags associated with each target word in the sentence based on processing of associated input vector. The method includes extracting, by the computing device, the causal text from the sentence based on the causal tags associated with each target word in the sentence. The method further includes providing, by the computing device, a response to the sentence inputted by the user based on the causal text extracted for the sentence.

16 Claims, 5 Drawing Sheets

US 10,528,669 B2

METHOD AND DEVICE FOR EXTRACTING CAUSAL FROM NATURAL LANGUAGE SENTENCES FOR INTELLIGENT SYSTEMS

This application claims the benefit of Indian Patent Application Serial No. 201841010091, filed Mar. 20, 2018, which is hereby incorporated by reference in its entirety.

FIELD

This disclosure relates generally to extracting causal from natural language sentences and more particularly to method and device for extracting causal from natural language sentences for intelligent systems.

BACKGROUND

Systems based on artificial intelligence, using Natural Language Processing (NLP) and Natural Language Understanding (NLU) to interact with users/customers are highly coveted requirement nowadays. Conventional systems, which use Artificial Intelligence (AI) to decipher a user query content, are obsessed with user intent and its identification. User intent is the information pertaining to 'what' the user wants. As intelligent systems are evolving, resolving only the user intent may not suffice.

Intelligent systems using NLU, rely heavily on identifying key information in incoming user queries. The most vital information being the user intent. However, just finding the user intent is not enough to understand a user query in its entirety, especially in systems that require specific information, for example, the cause or reason of the intent, called the causal. Causal relates to the cause or reason of the user intent. When a person is applying for a leave on an automated system or voicing an instruction to his intelligent personal assistant, the cause of an instruction is vital. Therefore, a system, which extracts the causal, identifies the reason for a task or information conveyed by the user. Such a tool would be immensely helpful for intelligent systems, especially cognitive systems and man machine interface based systems.

SUMMARY

In one embodiment, a method for extracting causal from natural language sentences is disclosed. The method includes determining, by a computing device, a plurality of parameters for each target word in a sentence inputted by a user. The method further includes processing for each target word, by the computing device, an input vector comprising the plurality of parameters for a causal classifier neural network. The method includes identifying, by the computing device, causal tags associated with each target word in the sentence based on processing of associated input vector. The method includes extracting, by the computing device, the causal text from the sentence based on the causal tags associated with each target word in the sentence. The method further includes providing, by the computing device, a response to the sentence inputted by the user based on the causal text extracted for the sentence.

In another embodiment, a computing device for extracting causal from natural language sentences is disclosed. The computing device includes a processor and a memory communicatively coupled to the processor, wherein the memory stores processor instructions, which, on execution, causes the processor to determine a plurality of parameters for each target word in a sentence inputted by a user. The processor instructions further cause the processor to process for each target word an input vector comprising the plurality of parameters for a causal classifier neural network. The processor instructions cause the processor to identify causal tags associated with each target word in the sentence based on processing of associated input vector. The processor instructions further cause the processor to extract the causal text from the sentence based on the causal tags associated with each target word in the sentence. The processor instructions cause the processor to provide a response to the sentence inputted by the user based on the causal text extracted for the sentence.

In yet another embodiment, a non-transitory computer-readable storage medium is disclosed. The non-transitory computer-readable storage medium has instructions stored thereon, a set of computer-executable instructions causing a computer comprising one or more processors to perform steps comprising determining a plurality of parameters for each target word in a sentence inputted by a user; processing for each target word an input vector comprising the plurality of parameters for a causal classifier neural network; identifying causal tags associated with each target word in the sentence based on processing of associated input vector; extracting the causal text from the sentence based on the causal tags associated with each target word in the sentence; and providing a response to the sentence inputted by the user based on the causal text extracted for the sentence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
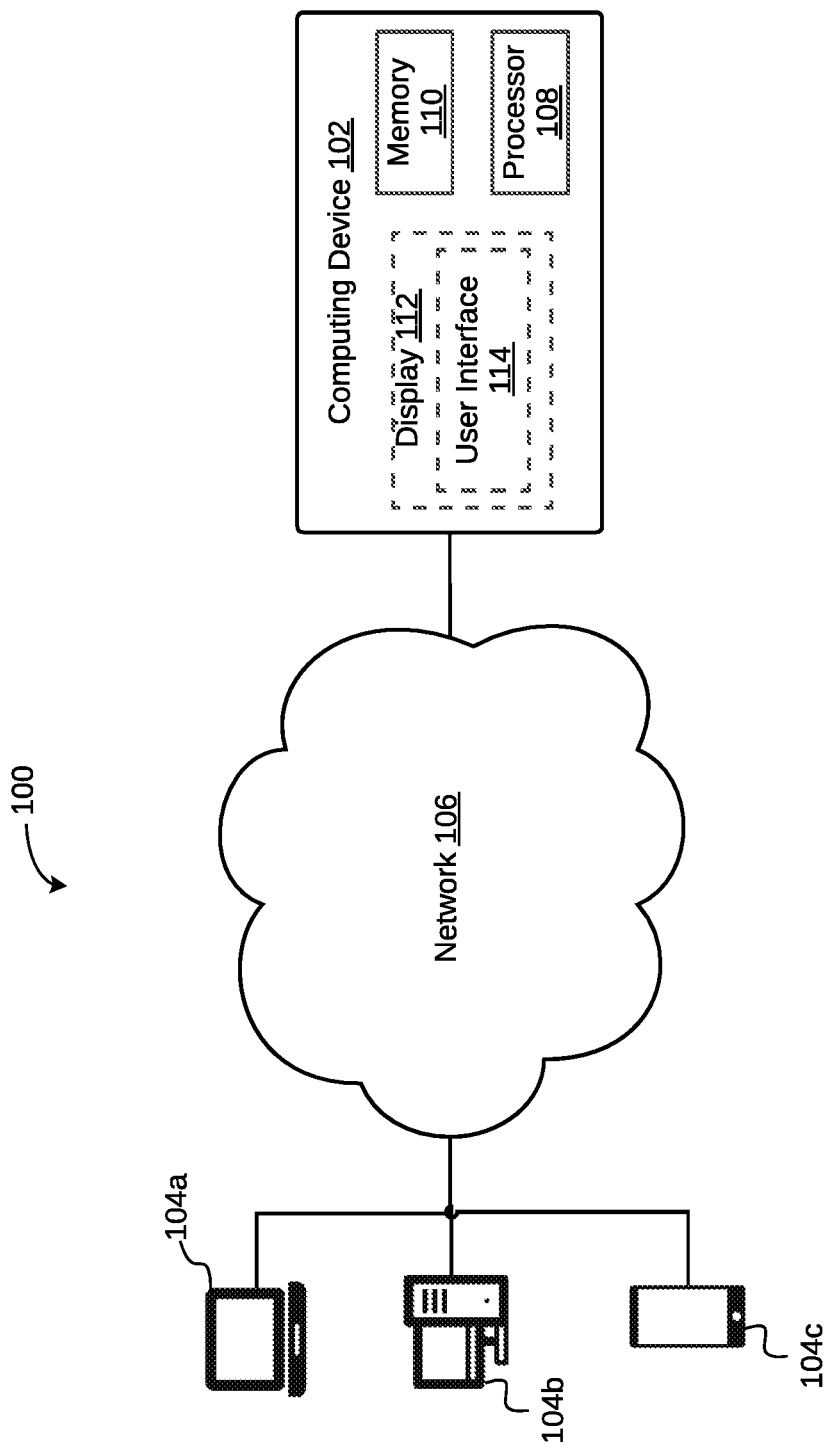
FIG. 1 is a block diagram illustrating a system for extracting causal from natural language sentences, in accordance with an embodiment.

Additional illustrative embodiments are listed below. In one embodiment, a system 100 for extracting causal from natural language sentences is illustrated in FIG. 1. The natural language sentences may occur within documents. Examples of these documents may include, but are not limited to PDF documents, images, or web-pages. Alternatively, the natural language sentences may be inputted by a user either vocally (for example, on an Interactive Voice Response (IVR) menu) or by way of text (for example, on a chat window). A natural language sentence may include an intent and a causal. The causal is the underlying reason for the intent. By way of an example, in the sentence: "I want a leave, as my wife is pregnant." The intent is "I want a leave" and the causal is "my wife is pregnant." In other words, a user wants a leave, because his wife is expecting. Extracting the causal from a natural language sentence is important. The reason being, when an intelligent system resolves a user query merely based on the intent, it may not be able to provide a sufficient resolution. However, resolving the user query based on the causal or reason provides a more relevant resolution.

System 100 includes a computing device 102 that extracts causal from natural language sentences. Examples of computing device 102 may include, but are not limited to an application server, a laptop, a desktop, a smart phone, or a tablet. The natural language sentences may be provided by one or more user through a plurality of computing devices 104 (for example, a laptop 104a, a desktop 104b, and a smart phone 104c). Plurality of computing device 104 may be communicatively coupled to computing device 102 via a network 106. Network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

When a user of laptop 104a, for example, may want to interact, via voice inputs, with an intelligent system (for example, an intelligent personal assistant, search engine, chat bots, question answering systems, conversation engines, or data mining tools) installed on computing device 102 to resolve a query, laptop 104a may communicate with computing device 102, via network 106. Computing device 102 may then process the voice inputs (which would be one or more natural language sentences) to extract the causal and accordingly respond to the query. To this end, computing device 102 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 110 further includes various modules that enable computing device 102 to extract causal from natural language sentences. These modules are explained in detail in conjunction with FIG. 2. Computing device 102 may further include a display 112 having a User Interface (UI) 114 that may be used by a user or an administrator to provide queries (either verbal or textual) and various other inputs to computing device 102. Display 112 may further be used to display a response or resolution to the query provided by the user. The functionality of computing device 102 may alternatively be configured within each of plurality of computing devices 104.

Figure 2:
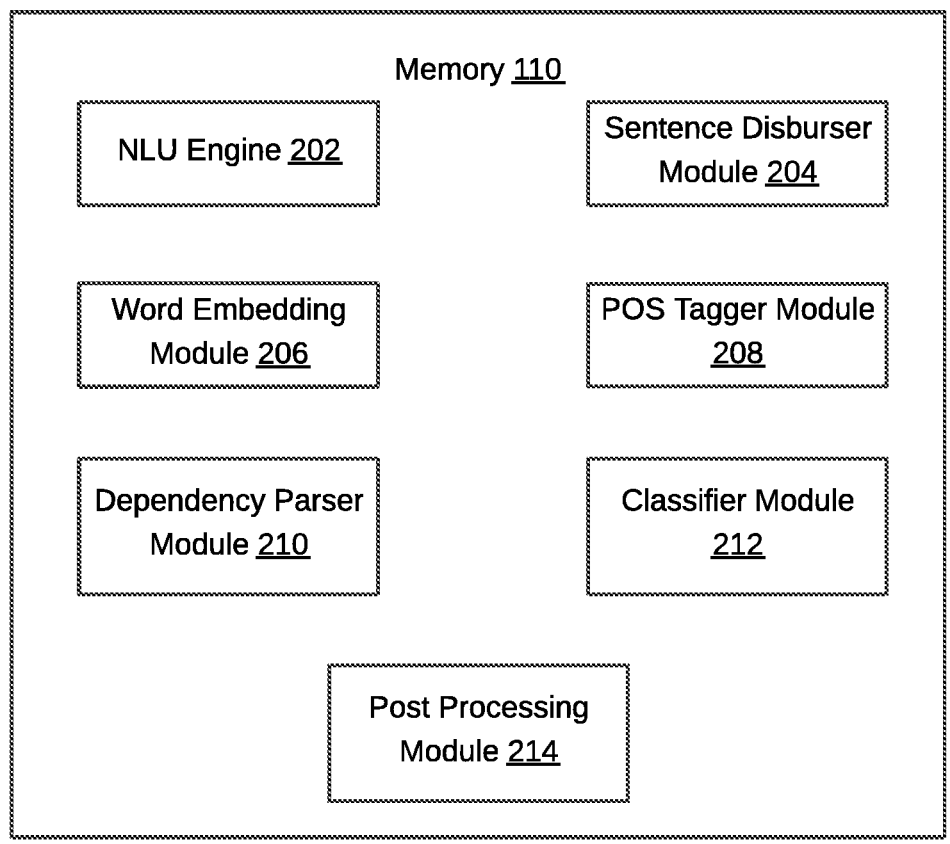
FIG. 2 is a block diagram illustrating various modules within a memory of a computing device configured to extracting causal from natural language sentences, in accordance with an embodiment.

Referring now to FIG. 2, a block diagram illustrating various modules within memory 110 of computing device 102 configured to extract causal from natural language sentences, in accordance with an embodiment. Memory 110 includes a Natural Language Understanding (NLU) engine 202, a sentence disburser module 204, a word embedding module 206, a Part Of Speech (POS) tagger module 208, a dependency parser module 210, a classifier module 212, and a post processing module 214.

NLU engine 202 receives text in natural language and deciphers the content, intent, and several other granular details from the text. Examples of NLU Engine 202 may include, but are not limited to search engines, chat bots, question answering systems, conversation engines, intelligent personal assistants, or data mining tools. Thereafter, sentence disburser module 204 obtains raw text from NLU Engine 202 as input. Sentence disburser module 204 then breaks down the raw text into sentences from which causal needs to be identified. The sentences are then disbursed to subsequent modules one by one.

Word embedding module 206 takes entire corpora from sentence disburser module 204 and computes word embeddings for every word in a knowledge resource. Word embeddings are representations of a word in a low-dimensional vector space (for example, 300 dimensions). Word embeddings map a word in raw text to a vector in a pre-decided vector space. The dimensions are latent and are obtained using the knowledge base. These vectors are used to capture some notion of the syntactic and semantic features of a word in a context. Word embedding may be computed using several algorithms, for example, 'word2vec' and 'GloVe'. This is further explained in detail in conjunction with FIG. 3.

POS tagger module 208 takes a natural language sentence as input and tags each item (word and punctuation) in the sentence with part-of-speech. This is further explained in detail in conjunction with FIG. 3. Dependency parser module 210 take a natural language sentence as an input and generates a parse tree for the given sentence. The parse tree is generated based on the intrinsic dependencies of the words in the sentence with each other. By way of an example, dependency parser module 210 identifies the subject, main verb, and predicate/object in a natural language sentence as well as many other dependencies. This is further explained in detail in conjunction with FIG. 3.

Classifier module 212 includes a causal classifier neural network, which is an artificial neural network model. It takes POS tags, the parse tree and word embeddings of words as features. A raw corpus of natural language sentences is taken and each sentence is tagged with classes with respect to the causal. This generates a labelled/tagged corpus. Each tagged sentence along with the features mentioned above, is fed to classifier module 212 in order to train it to differentiate causal words from others. Post processing module 214 accepts a sentence tagged with causal classes generated by classifier module 212 and extracts the causal text contained in the sentence. This is further explained in detail in conjunction with FIG. 3.

Figure 3:
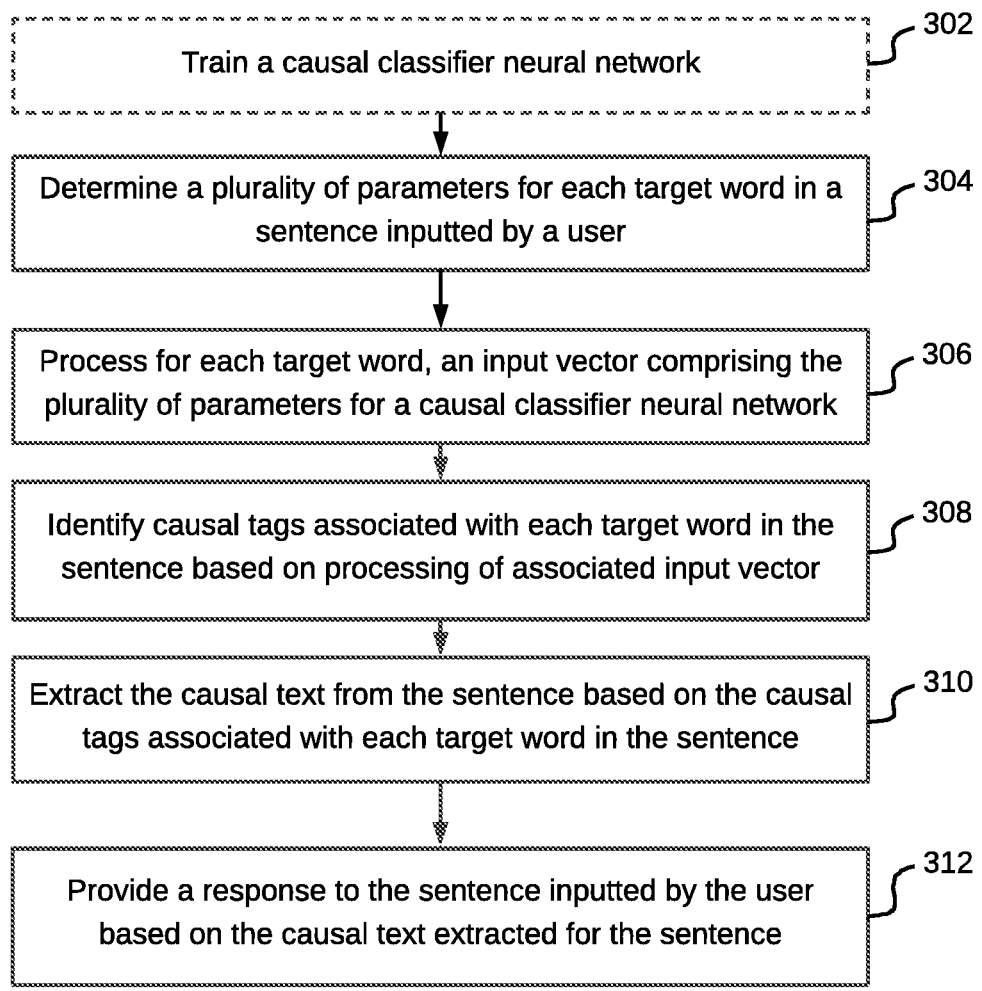
FIG. 3 illustrates a flowchart of a method for extracting causal from natural language sentences, in accordance with an embodiment.

Referring now to FIG. 3, a flowchart of a method for extraction of causal from natural language sentences is illustrated, in accordance with an embodiment. At step 302, computing device 102 trains a causal classifier neural network to identify causal tags associated with sentences inputted by a user. The sentences inputted by the user are natural language sentences. The data used to train the causal classifier neural network may primarily be extracted from generic corpora, for example, news and blogs, and may include a set of documents or articles. By way of an example, BBC news dataset with over a million words may be use for data extraction.

The data may be extracted and collected in the form of a raw text corpus that includes hundreds and thousands of natural language sentences. The data may be used to extract key ingredients and is also labelled with one or more causal classes in order to train the causal classifier neural network. The one or more causal classes may include, but are not limited to Begin Causal, Inside Causal, and Others. These are explained in detail below. Additionally, in order to train the causal classifier neural network, such that, commendable accuracies are achieved in identifying causal classes, the data is collated in such a way that it is as varied as possible. This increases the span and variance of the data, thereby reducing chances of the causal classifier neural network coming across completely unseen pattern instances.

To train the causal classifier neural network, the extracted data, which acts as knowledge base, is manually tagged based on one or more causal classes. These tags are required by the causal classifier neural network to understand role of a word in a context. In an embodiment, the tags that may be used to tag words in the knowledge base may be represented as follows:

'B-CAU'— This tag means "Begin-Causal" and indicates that a word marks beginning of causal in a sentence.

'I-CAU'— This tag means "Inside-Causal" and indicates that a word is part of the causal in the sentence.

'O'— This is the "Others" tag and indicates that a word neither marks beginning of the causal in the sentence nor us a part of the causal.

By way of an example, for the sentence: "I want a leave as my wife is pregnant," tags may be assigned manually as represented by (1):

I_O want_O a_O leave_O as_O my_B-CAU wife_I-CAU is_I-CAU pregnant_I-CAU (1)

Thus, the words: "I," "want," "a," "leave," and "as" are tagged as Others, the word "my" is tagged as Begin-Causal, thereby marking the beginning of causal in the sentence above, and the words: "wife," "is," and "pregnant" are tagged as Inside-Causal. Thus, the line "my wife is pregnant" is the causal in the above sentence. Once the extracted data is assimilated and prepared, the causal classifier neural network is trained based on causal tags assigned to words in sentences.

Further, in order to extract word embeddings for words in the extracted data, which is a raw text corpus, the extracted data is fed into a word embeddings trainer module in computing device 102. The word embeddings trainer module maybe a shallow artificial neural net that captures semantic and syntactic essence of words in a context. As a result, word embeddings for each word in the extracted data is obtained and latent semantic relationships among words is also extracted. As the extracted data used for training is generic, varied, and large in size, computing device 102 works across most occurrences of causal in different sentences.

A word embedding for a words is a vector representation of the word. This vector represents the syntactic and semantic essence of that word, occurring in a context. Using this vector representation, words that are unseen to the causal classifier neural network may also be efficiently handled. In order to obtain word embedding, the input is a word from the knowledge base and output is the context of the word. The context of the word may have a window size of 10, for example, which may be an average sentence size in the knowledge base. Thus, a word is represented by the context of the words in its vicinity. By way of an example, the words 'home' and 'abode' may appear in similar contexts in the knowledge base, thus their vector representation may be similar and the causal classifier neural network model may predict them correctly. As continuation of the example above, the word 'home' may have been used to train the causal classifier neural network and 'home' may be detected as a causal. As the causal classifier neural network is trained using word embeddings, when it encounters the word 'abode' (which may be a new word), the causal classifier neural network will classify the word 'abode' also as a causal. This is because vector representation of the words 'home' and 'abode' may be similar.

Once the causal classifier neural network has been trained, a sentence may be inputted by a user in the form of a textual input or a vocal input. The sentence may be provided to an intelligent system installed on computing device 102. Examples of the intelligent system may include, but are not limited to an intelligent personal assistant, search engine, chat bots, question answering systems, conversation engines, or data mining tools.

At step 304, computing device 102 determines a plurality of parameters for each target word in the sentence inputted by the user. For a target word, the plurality of parameters include a POS vector associated with the target word. The POS vector includes a POS tag for the target word and a POS tag for two or more words preceding the target word in the sentence. For each target word, a POS vector is considered because in a sentence, the label of a target word depends on the context of the previous words in the sentence. For an input sentence in natural language, each word is tagged with an appropriate POS tag. Examples of POS tags may include, but are not limited to NNP, i.e., proper noun, VB, i.e., verb, PRP, i.e., preposition, NN, i.e., noun, RB, i.e., adverb, and IN, i.e., interjection. By way of an example, for the sentence: "I could not go to my office as it was raining," will be POS tagged as represented by (2):

I/PRP could/VB not/RB go/VB to/TO my/PRP office/NN as/IN it/PRP was/VB raining/VB (2)

For a target word in a sentence, the POS vector may be represented using equation 3 given below:

POS Vector=$(x_{i-2}, x_{i-1}, x_i)$ (3)

where, $x_i$ is the POS tag assigned to the target word;

$x_{i-1}$ is the POS tag assigned to the first word immediately preceding the target word in the sentence;

$x_{i-2}$ is the POS tag assigned to the second word immediately preceding the target word in the sentence.

Thus, a POS vector for each word in the sentence inputted by the user will be determined. In continuation of the example given above, for the word "raining," the two preceding words are "it" and "was." Thus, the POS vector for the word "raining" is represented by 4:

POS vector for "raining"=$(PRP, VB, VB)$ (4)

The plurality of parameters for the target word further include a word embedding of the target word and a word embedding for a head word of the target word. This may be represented by 5 and 6 below:

Word embedding for the target word–$W_1$ (5)

Word embedding for the head word–$W_h$ (6)

The plurality of parameters for the target word further include a dependency label for the target word. The dependency label for the target word indicates relation of the target with the head word in the sentence. The dependency label for the target word may be depicted by 7 given below:

Dependency label for the target word–$D_i$ (7)

A head word for the target word may be determined based on a dependency parser tree made for the sentence. The dependency parser tree depicts dependencies between words within the sentence. In a dependency parser tree, the grammatical structure of the sentence is also analyzed thereby establishing relationships between head words and words which modify these head words. The dependency parser tree may include two parts, i.e., a parser tree and dependencies among the words in the sentence. These dependencies include different dependency labels. By way of an example, a parser tree for the following sentence: "I could not go to my office as it was raining" is depicted below:

```
(ROOT
  (S
    (NP (PRP I))
    (VP (MD could) (RB not)
      (VP (VB go)
        (PP (TO to)
          (NP (PRP$ my) (NN office)))
        (SBAR (IN as)
          (S
            (NP (PRP it))
            (VP (VBD was)
              (VP (VBG raining)))))))))
```

The dependencies for the above parser tree, which may be determined based on Stanford type dependencies, are depicted below. The dependencies include multiple dependency labels. The Stanford type dependencies are explained in detail in the paper titled "Stanford Typed Dependencies Manual," authored by Marie-Catherine de Marneffe and Christopher D. Manning, and published in September 2008.

nsubj (go-4, I-1)
aux(go-4, could-2)
neg(go-4, not-3)
root(ROOT-0, go-4)
case(office-7, to-5)
nmod:poss(office-7, my-6)
nmod(go-4, office-7)
mark(raining-11, as-8)
nsubj(raining-11, it-9)
aux(raining-11, was-10)
advcl(go-4, raining-11)

The dependencies are based on head word for each target word. For example, the dependency label: nsubj (go-4, I-1) implies that "I" is the subject of the sentence and the head word is the verb "go."

Once the plurality of parameters discussed above have been determined for each target word, computing device 102, at step 306, processes an input vector for each target word for the causal classifier neural network. The input vector includes the plurality of parameters determined at 3, 5, 6, and 7 given above. The input vector may be depicted by equation 8 given below:

Input vector→$(x_{i-2}, x_{i-1}, x_i, W_i, W_h, D_i)$ (8)

In an embodiment, the input vector is fed into the causal classifier neural network with Rectified Linear Units (RELU) activation units. In an exemplary embodiment, the feed-forward equations may be formally represented using equations 9, 10, and 11 given below:

$$Z = W(x_{i-1}, x_{i-1}, x_i, W_i, W_h, D_i) + b^{(1)} \quad (9)$$

$$a = f(z) \quad (10)$$

$$h = g(U^T a + b^{(2)}) \quad (11)$$

where,
W and U are the model parameters;
$b^{(1)}$ and $b^{(2)}$ are the biases;
f is the RELU function;
g is the softmax function In the above equations, W is the parameter of the input to hidden layer of the causal classifier neural network and $W_i$ and $W_h$ are word embeddings (or word vectors) of the target words and the head word. This represents the semantic and syntactic understanding of the target word. An input vector of size 300 may be used. The back-propagation algorithm may be used to train the parameters of the causal classifier neural network and the biases (i.e., $b^{(1)}$ and $b^{(2)}$) with a loss function as categorical cross-entropy. Stochastic gradient descent for gradient learning with adaptive momentum optimization may be used.

Based on processing of associated input vector using the causal classifier neural network, computing device 102, at step 308, identifies causal tags associated with each target word in the sentence. Thus, each word in the sentence is tagged with one or more of the following causal tags: B-CAU, I-CAU or O, such that, each causal tag is associated with a causal class. These have been explained before. By way of an example, for the sentence: "Due to a severe hamstring injury he had to take an early retirement." After input vectors for each word in this sentence are processed by the causal classifier neural network, the following causal tags are identified for each word in the sentence:

"Due_O to_O a_O severe_B_CAU, hamstring_I-CAU injury_I-CAU he_O had_O to_O take_O an_O early_O retirement_O"

The following words are identified as falling in the Others Causal class: "Due," "to," "a," he," "had," "to," "take," "an," "early," "retirement." The following word is identified as falling in the Begin Causal class: Severe. Finally, the following words are identified as falling in the Inside Causal class: "hamstring" and "injury."

Based on the causal tags associated with each target word in the sentence, computing device 102, at step 310, extracts the causal text from the sentence. In continuation of the example above, the causal text is extracted as "severe hamstring injury."

This causal text may then be fed into a man machine interface based cognitive and intelligent system installed on computing device 102, for example, a search engine, a chat bot, a dialogue based system, or a question answering system. At step 312, computing device 102 provides a response to the sentence inputted by the user based on the causal text fed into the intelligent system. Since, based on the causal text, the intelligent system is able to accurately determine the cause in the sentence provided by the user, the intelligent system is able to provide a very relevant response. The response may include one or more of an answer to the query and an action corresponding to the query. By way of an example, the user may input the sentence "I am on leave as my wife is pregnant." In this case the causal "wife is pregnant" is extracted. Based on this causal, an intelligent leave management system may automatically open the leave application relevant for a paternity leave. By way of another example, the user may input the sentence: "I am not able to walk as my knee is hurting," in an intelligent search engine. As the causal is identified as "my knee is hurt," the intelligent search engine will provide details related to treatments or procedure for knee treatment that would enable a user to walk comfortably.

Figure 4:
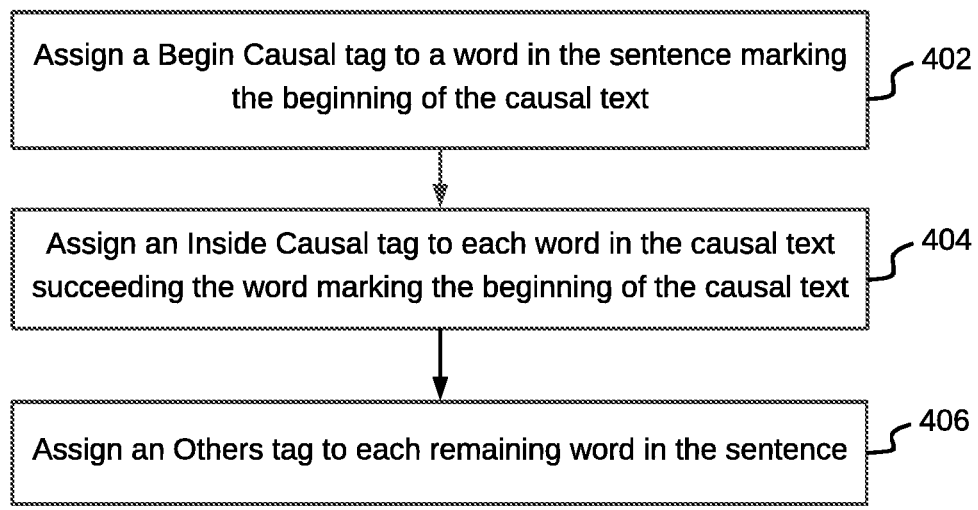
FIG. 4 illustrates flowchart of a method for identifying causal tags associated with each target word in the sentence based on processing of associated input vector

Referring now to FIG. 4, a flowchart of a method for identifying causal tags associated with each target word in the sentence based on processing of associated input vector is illustrated, in accordance with an embodiment. At step 402, a Begin Causal tag is assigned to a word in the sentence that marks the beginning of the causal text. At step 404, an Inside Causal tag is assigned to each word in the causal text that succeeds the word marking the beginning of the causal text. Thereafter, at step 406, an Others tag is assigned to each remaining word in the sentence. This has already been explained in detail in conjunction with FIG. 3 along with an example.

Figure 5:
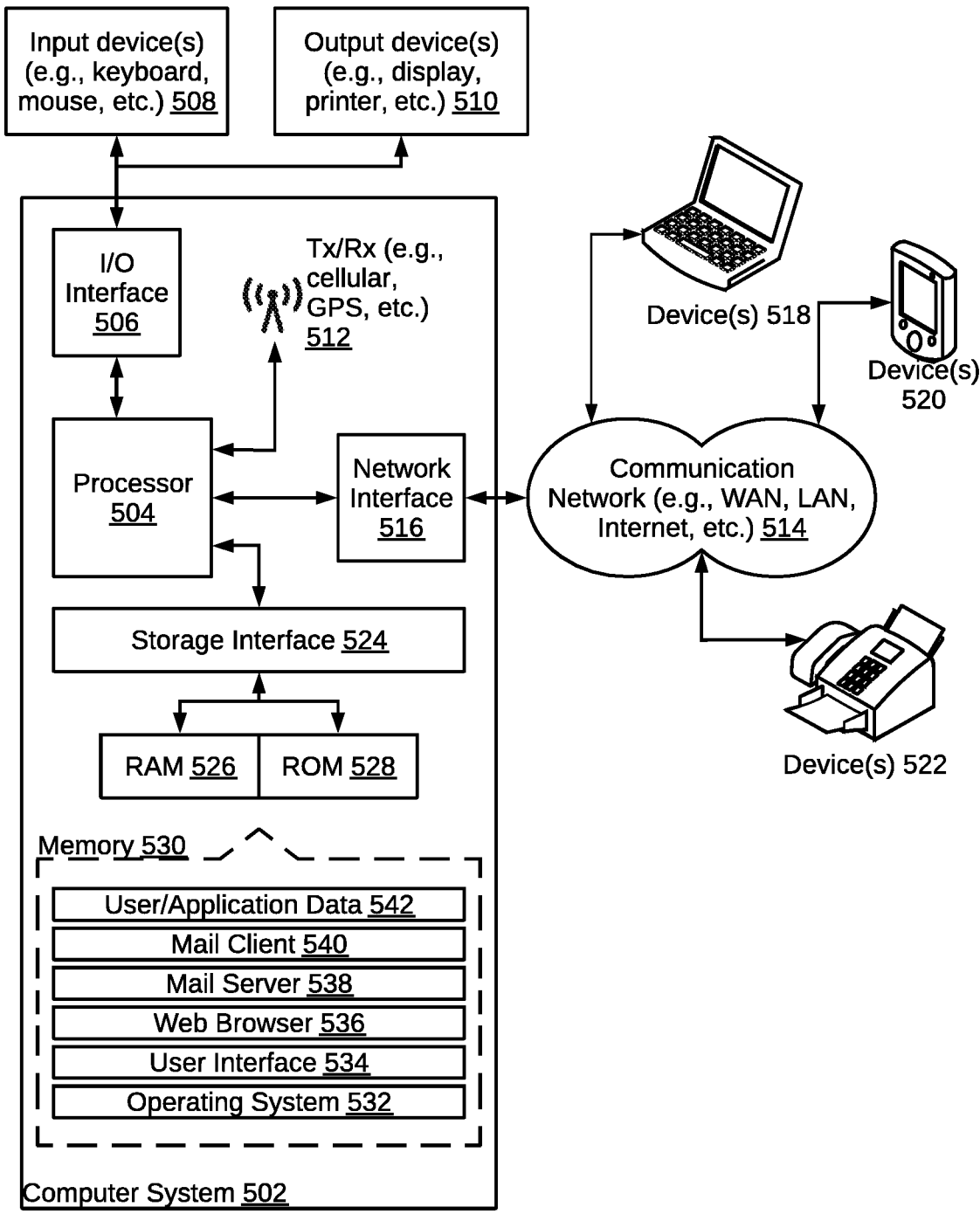
FIG. 5 illustrates a block diagram of an exemplary computer system for implementing various embodiments.

FIG. 5 is a block diagram of an exemplary computer system for implementing various embodiments. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'SCORE® processor, ITANIUIM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PEW® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for extracting causal from natural language sentences for intelligent systems. The method, enables identifying causals from natural language text utterances in interactive systems, which is highly usable by man machine interaction based cognitive systems. The method can automatically learn words and their semantic interpretations across a huge set of words.

The specification has described method and device for extracting causal from natural language sentences for intelligent systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extracting causal from natural language sentences, the method comprising:
determining, by a computing device, a plurality of parameters for each target word in a sentence inputted by a user wherein the plurality of parameters for a target word comprise a Part of Speech (POS) vector associated with the target word comprising a POS tag for the target word and a POS tag for at least two words preceding the target word, a word embedding for the target word, a word embedding for a head word of the target word, and a dependency label for the target word;

processing for each target word, by the computing device, an input vector comprising the plurality of parameters for a causal classifier neural network;

identifying, by the computing device, causal tags associated with each target word in the sentence based on processing of associated input vector;

extracting, by the computing device, the causal text from the sentence based on the causal tags associated with each target word in the sentence; and providing, by the computing device, a response to the sentence inputted by the user based on the causal text extracted for the sentence.

2. The method of claim 1, wherein the dependency label for the target word indicates relation of the target with the head word in the sentence.

3. The method of claim 1 further comprising training the causal classifier neural network to identify causal tags associated with words within sentences inputted by user.

4. The method of claim 1, wherein the sentence is inputted by the user as at least one of a verbal input and a textual input.

5. The method of claim 4, wherein the sentence comprises a query asked by the user.

6. The method of claim 5, wherein the response comprises at least one an answer to the query and an action corresponding to the query.

7. The method of claim 1, wherein the causal tags comprise Begin Causal tag, Inside Causal tag, and Others tag.

8. The method of claim 7, wherein the identifying the causal tags associated with each target word comprises:

assigning a Begin Causal tag to a word in the sentence marking the beginning of the causal text;

assigning an Inside Causal tag to each word in the causal text succeeding the word marking the beginning of the causal text; and assigning an Others tag to each remaining word in the sentence.

9. A computing device for extracting causal from natural language sentences, the device comprising:

a processor; and a memory communicatively coupled to the processor, wherein the memory stores processor instructions, which, on execution, causes the processor to:

determine a plurality of parameters for each target word in a sentence inputted by a user wherein the plurality of parameters for a target word comprise a Part of Speech (POS) vector associated with the target word comprising a POS tag for the target word and a POS tag for at least two words preceding the target word, a word embedding for the target word, a word embedding for a head word of the target word, and a dependency label for the target word;

process for each target word an input vector comprising the plurality of parameters for a causal classifier neural network;

identify causal tags associated with each target word in the sentence based on processing of associated input vector;

extract the causal text from the sentence based on the causal tags associated with each target word in the sentence; and provide a response to the sentence inputted by the user based on the causal text extracted for the sentence.

10. The computing device of claim 9, wherein the dependency label for the target word indicates relation of the target with the head word in the sentence.

11. The computing device of claim 9, wherein the processor instructions further cause the processor to train the causal classifier neural network to identify causal tags associated with words within sentences inputted by user.

12. The computing device of claim 9, wherein the sentence is inputted by the user as at least one of a verbal input and a textual input.

13. The computing device of claim 12, wherein the sentence comprises a query asked by the user, and wherein the response comprises at least one an answer to the query and an action corresponding to the query.

14. The computing device of claim 9, wherein the causal tags comprise Begin Causal tag, Inside Causal tag, and Others tag.

15. The computing device of claim 9, wherein to identify the causal tags associated with each target word, the processor instructions further cause the processor to:

assign a Begin Causal tag to a word in the sentence marking the beginning of the causal text;

assign an Inside Causal tag to each word in the causal text succeeding the word marking the beginning of the causal text; and assign an Others tag to each remaining word in the sentence.

16. A non-transitory computer-readable storage medium having stored thereon, a set of computer-executable instructions causing a computer comprising one or more processors to perform steps comprising:

determining a plurality of parameters for each target word in a sentence inputted by a user wherein the plurality of parameters for a target word comprise a Part of Speech (POS) vector associated with the target word comprising a POS tag for the target word and a POS tag for at least two words preceding the target word, a word embedding for the target word, a word embedding for a head word of the target word, and a dependency label for the target word;

processing for each target word an input vector comprising the plurality of parameters for a causal classifier neural network;

identifying causal tags associated with each target word in the sentence based on processing of associated input vector;

extracting the causal text from the sentence based on the causal tags associated with each target word in the sentence; and providing a response to the sentence inputted by the user based on the causal text extracted for the sentence.

* * * * *